US009009253B2

(12) United States Patent  (10) Patent No.: US 9,009,253 B2
Chandrasekhar et al.  (45) Date of Patent: Apr. 14, 2015

(54) OPTIMIZING SERVER RESOURCES USING MULTIPLE RETRY FOR HIGH TRAFFIC WEBSITES

(75) Inventors: Jayadev Chandrasekhar, Sunnyvale, CA (US); David Su, Sunnyvale, CA (US); Prasanna Padmanabhan, Sunnyvale, CA (US); Nicholas Zakas, Mountain View, CA (US); Okan Alper, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 604 days.

(21) Appl. No.: 13/028,888

(22) Filed: Feb. 16, 2011

(65) Prior Publication Data

US 2012/0209945 A1    Aug. 16, 2012

(51) Int. Cl.
*G06F 15/16*    (2006.01)
*G06F 17/30*    (2006.01)
*H04L 29/06*    (2006.01)
*H04L 29/08*    (2006.01)
*H04L 12/66*    (2006.01)

(52) U.S. Cl.
CPC .......... *G06F 17/30902* (2013.01); *H04L 29/06* (2013.01); *H04L 29/08072* (2013.01); *H04L 12/66* (2013.01)

(58) Field of Classification Search
CPC ............................................... H04L 29/08072
USPC .......... 709/236, 218–219, 232, 217; 707/999; 719/315; 715/745
See application file for complete search history.

(56) References Cited

U.S. PATENT DOCUMENTS

| 6,029,175 | A * | 2/2000 | Chow et al. ........................... 1/1 |
| 7,953,820 | B2 * | 5/2011 | Stevens et al. ................ 709/219 |
| 2003/0188009 | A1 * | 10/2003 | Agarwalla et al. ............ 709/236 |
| 2004/0107267 | A1 * | 6/2004 | Donker et al. ................ 709/218 |
| 2005/0240940 | A1 * | 10/2005 | Quinet et al. ................. 719/315 |
| 2005/0267980 | A1 * | 12/2005 | Warren et al. ................. 709/232 |
| 2010/0180208 | A1 * | 7/2010 | Kasten et al. ................. 715/745 |

OTHER PUBLICATIONS

Apache, "HTTP Server Project", The Number One HTTP Server on the Internet, website: http://httpd.apache.org/, 2 pages, dated in 2011.

(Continued)

*Primary Examiner* — Helal A Algahaim
*Assistant Examiner* — Mahmoud Ismail
(74) *Attorney, Agent, or Firm* — Hickman Palermo Becker Bingham LLP; Edward A. Becker

(57) ABSTRACT

A method for optimizing resources on a web server is provided. A web page may include areas for displaying content that is time consuming to retrieve. The content may be geographically far away or the content server itself may be slow. A caching proxy between the web server and the content server responds to requests for data immediately, with or without the data requested from the cache. On a cache miss, the caching proxy asynchronously retrieves data so that the next time the same content is requested, the data should be available in the cache. Asynchronous retrieval means that no valuable resources are tied up on the web server while waiting for the content to be provided from the content server. The initial web page sent from the web server to the web browser includes retry logic. The data may be retrieved from the cache during one of the retries.

16 Claims, 6 Drawing Sheets

(56) References Cited

OTHER PUBLICATIONS

Olson et al., "USENIX", The Advanced Computing System Association, published in the Proceeding of the FREENIX Track: 1999 USENIX Annual Technical Conference, Jun. 6-11, 1998, 10 pages.

Wikipedia, "Ajax (programming)", Website: http:/en.wikipedia.org/wiki/Ajax (programming), last accessed Jun. 21, 2011, 1 page.
Apache Traffic Server, "Traffic Server", website: http://trafficserver.apache.org, last accessed Jun. 21, 2011, 2 pages.
Seltzer et al., A New Hashing Package for UNIX, dated in 1991, 14 pages.

* cited by examiner

OPTIMIZING SERVER RESOURCES USING MULTIPLE RETRY FOR HIGH TRAFFIC WEBSITES

FIELD OF THE INVENTION

The present disclosure generally relates to optimizing web server resources, and more specifically to freeing web server resources while requesting high latency application data.

BACKGROUND

The World Wide Web is a popular application of the client/server computing model. FIG. 1 is a simplified block diagram of the relationship between elements used in a web system. One or more Web Clients 110, each of which is a computer running a software process such as a Web Browser Program 115, are connected to Web Server 120 over a local or wide area network within a region, for example Region 150. The Web Server 120 may be communicatively coupled with a Caching Proxy Server 130 which is located near the Web Server 120 and accessible, for example, over a local area network or local interconnect. The Caching Proxy Server 130 may access Content Servers 142, 144, and 146 located locally or over a global information network such as the Internet. Users typically use a Web Browser Program 115, such Mozilla Firefox, Microsoft Explorer, etc., on a Web Client 110 to display web pages and to perform transactions with various content servers for accessing desired information. Browsers are computer programs that are designed to request data content and user interface items from the network, and to decode and display the requested items when they are provided to clients 110.

A Web Server 120 contains multimedia information resources, such as documents and images, to be provided to clients upon demand. The Web Server 120 may additionally or alternatively contain software for dynamically generating such resources in response to requests. A Web Browser Program 115 and Web Server 120 communicate using one or more agreed-upon protocols that specify the format of the information that is communicated. The Web Browser Program 115 establishes a connection to the Web Server 120 using a communication protocol called the Hypertext Transfer Protocol (HTTP). A Uniform Resource Locator (URL) uniquely identifies each information object stored on, dynamically generated, or retrieved by the Web Server 120. A URL is a form of network address that identifies the location of information stored in a network.

Some desired content may be available locally within the same region as the web server, such as Content Server 142. An example of locally provided services may be a weather or news service that supplies information about the local region. However, often the requested URL references content supplied by a content provider that is not related to or even co-resident with the web server. For example, an installation of web servers in India may receive a request to access Facebook, and the Facebook servers are not located in India. With regard to FIG. 1, Region 150 may be in India, and Region 160 may be in the United States with Region 160 hosting Facebook as an example Content Server 144.

A key factor that impacts the time that a web server process is tied up waiting to satisfy a request for a URL may be the speed with which a separate Content Server 142, 144, or 146 can supply the requested information. Content server response time may be limited by the speed, reliability, and congestion level of the network route through the network, by geographical distance delays, and by server load level.

Accordingly, web server process times can be reduced by storing replicas of popular content objects in repositories geographically located close to the web server. Each local repository for object replicas is generally referred to as a cache. A web server may be able to access replicas from a topologically proximate cache faster than possible from the original content server, while at the same time reducing Internet server traffic.

In one arrangement, as shown in FIG. 1, the Proxy Cache 135 is located in a Caching Proxy Server 130 that is logically interposed between the Web Server 120 and the Content Servers 142, 144, and 146. The Caching Proxy Server 130, also called a proxy server, provides a "middleman" gateway service, acting as a content server to the Web Server 120, and a client to the Content Servers 142, 144, and 146. A proxy server equipped with a cache is called a caching proxy server, a caching server, or a "proxy cache".

The proxy server 130 intercepts requests for resources that are directed from the Web Server 120 to one of the Content Servers 142, 144, or 146. When the Proxy Cache 135 has a replica of the requested resource that meets certain freshness constraints, the proxy responds to the web server and serves the resource directly. In this arrangement, the number and volume of long distance data transfers over the network are greatly reduced. As a result, network resources or objects are provided more rapidly to the web server, thus freeing up processes faster. Freeing up web server processes enables new requests to be serviced.

THE WEB PAGES

The user interface of a browser includes, among other things, (1) a content display region, and (2) a control region. The control region of a browser may contain any number and type of controls that allow a user to access the functionality of the browser. An example control is a region on the display in which the user clicks a mouse button to request that certain content be displayed. The content display region of a browser is a region dedicated to the display of content retrieved by the browser.

Users typically receive information from the web in the form of web pages that are displayed in the content display region of the browser. Web pages have a hierarchical architecture. Each web page may consist of various items, where each distinct item must be separately fetched. Items that are parts of a web page are referred to herein as "embedded" items. The embedded items of a single web page may even reside on different web servers. An embedded item may be, for example, a digital image, a sound file, or a link to another web page. Embedded items may themselves be web pages. For example, a web page may specify (1) a set of display areas and (2) content to be displayed in those areas. A display area is an area within the page dedicated to displaying particular content.

A web page may be expressed in source statements such as HTML, Dynamic HTML (DHTML) or executable statements such as JavaScript. The browser interprets the source and/or executable statements representing a web page, and in response to decoding tags to embedded items, sends requests to retrieve the embedded items to "complete" the generation of the web page. From the web page statements, the browser knows how to retrieve each embedded document based on the URL of the document. Since an embedded item may itself include embedded items, the browser recursively requests the embedded items until the document is fully rendered.

A web page document to be displayed within a display area may be expressed as executable statements that include the ability to make asynchronous, event-driven requests to the web server for information. Such requests are asynchronous with respect to the browser because the user may continue interacting with the browser without having to wait for the asynchronous request to complete. Events such as user input or timer expiration may trigger an executable statement to execute, resulting in a web server request. Executable statements can be event triggered and executed asynchronously. Such executable statements may be composed in Asynchronous JavaScript® and XML (AJAX), for example.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
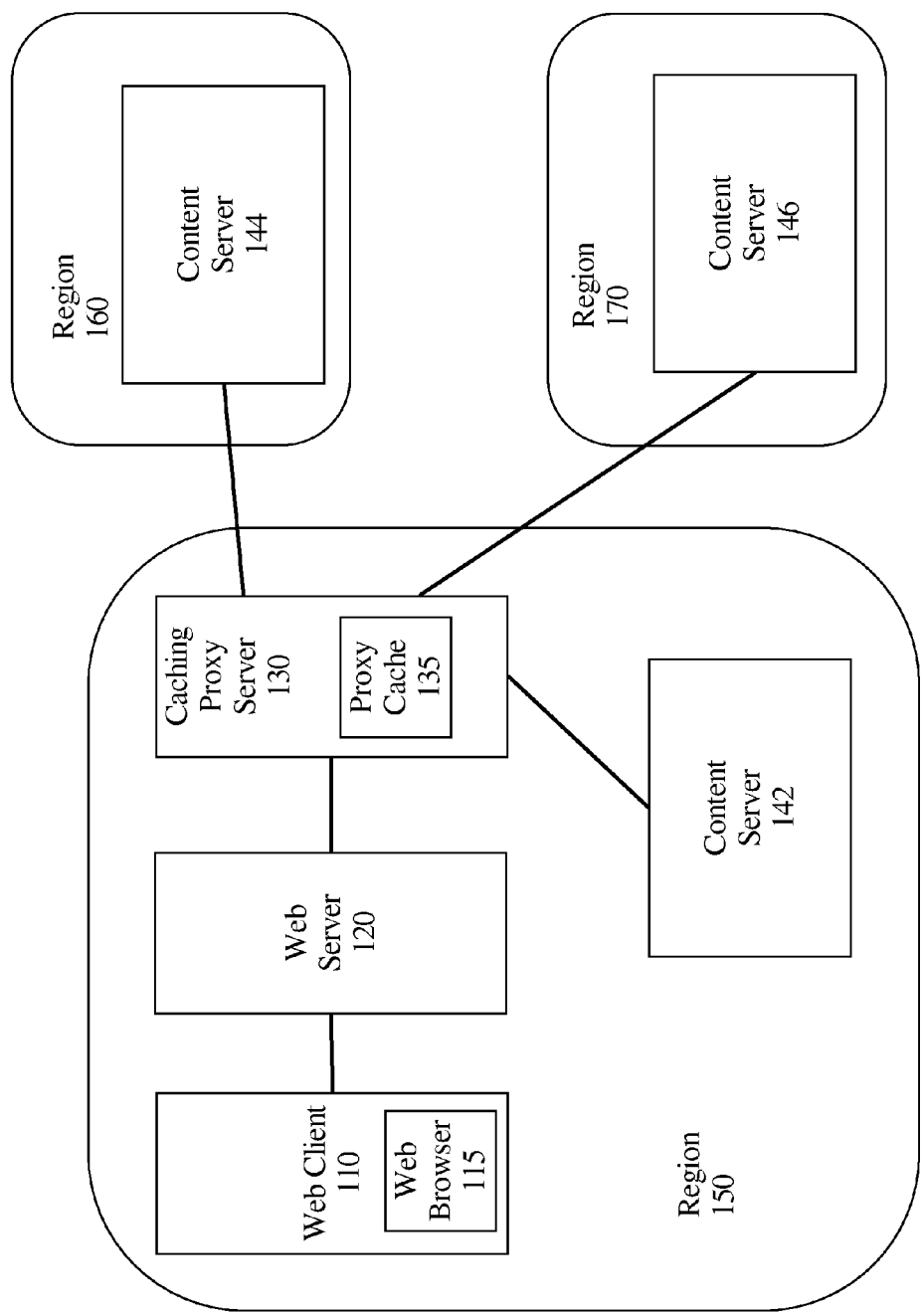
FIG. 1 illustrates elements used in a web system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A web page may contain a combination of locally stored content as well as links to content that is served by a geographically distant server. A web server receiving web page requests from client browsers returns web pages locally stored by the web server and retrieves content from potentially distant content servers. The term "web page" is used herein to refer to these locally stored web pages that contain links to content services. The term "service content" is used herein to refer to content supplied by a separate service and which is displayed within the web page. A "service content request" is sent to a service content provider which returns content for display within the web page. A service content request may be initiated as part of fulfilling a web page request, by a user clicking on a service icon displayed on a control region of the web page, or initiated by executable statements embedded in the web page that are triggered to execute by some other event.

Popular web servers, such as the Apache Web Server, are process-based; that is, for each request received, a process is allocated to handle the request. Such web servers can only maintain a fixed but configurable maximum number of active connections/processes at a time. For example, a web server configured with a maximum of 65 connections/processes may only be able to service 65 requests simultaneously. To handle more simultaneous requests would require deploying more computers for use as web servers. Thus, each request to a web server consumes valuable and constrained resources on the web server including a connection and a corresponding process.

When the maximum number of processes is already in use, subsequently-arriving requests may have to wait in a queue before being serviced until a request already assigned a process is satisfied. The web server may be idle and yet still not able to receive incoming requests because a connection from a web browser remains active even when the work performed by its corresponding web server process is waiting for a response from a content service. Thus, waiting for a response to a content service request may delay the processing of incoming web page requests.

There can be a large difference in the amount of time required to satisfy a local web page request as compared to the time required to satisfy a request for service content when the content server is far away. For example, a content service request could take several seconds to complete, but a request for a locally stored web page may be satisfied within an order of hundreds of milliseconds. Yet, a request for a web page might be queued behind a service content request, and thus have to wait several seconds to be processed.

One way to reduce the time that a web server must wait when providing a web page with embedded content is for the web server to return the web page with executable statements associated with each service icon rather than returning the service content itself. The executable statements can request service content separately from the web page request. Upon receipt of the web page, the browser may automatically make subsequent calls to the web server for each content service to request the missing content. Having the browser make separate service content requests for each service shortens the amount of time any individual request makes, and thus, shortens the time each corresponding process is active on the server.

Alternatively, the browser may not request the embedded content until the user requests it. In a web page such as the portal page at yahoo.com, there are many available services that can return embedded content, most of which will not be used at any given point in time. Server and network resources can be saved by requesting content from the services only upon user request. However, when the user requests the content, the web server might still wait on the order of several seconds for content that is produced remotely, and this reduces the number of incoming web page requests that the web server is able to satisfy per unit time.

Contention for web server resources may further be relieved by dedicating a separate set of web servers for responding to local web page requests from a set of web servers that respond to content service requests. In that way, dedicated web servers may process many more web page requests much quicker and without queuing the requests behind lengthy service content requests. Because only a few of the many service icons on a portal page such as yahoo.com may be used, there may be many more web page requests than content service requests. Thus, there may be many more web servers in the set of web servers that respond to web page requests than the number of web servers dedicated to responding to content requests. In one embodiment, 90 machines may be dedicated to responding to page views whereas 25 machines may be dedicated to responding to content service requests. The size of each set may vary depending on the region, the services referenced by the web pages, and the location of those services relative to the region.

Even when a web server only receives content service requests, these requests may be queued waiting for a process behind other lengthy content service requests. Thus, it is beneficial to reduce the wait time on web servers dedicated to satisfying service content requests. An approach that can be used to minimize the wait time of a web server process is to introduce a proxy cache geographically close to the web server, residing between the web server and a remote content server. When a user requests content, the web server may forward the request to the proxy cache server. If the content is already cached, the proxy cache server returns the content immediately, and the web server need not wait until the remote content provider is invoked to return the data. If the content is not in the cache, the proxy server may immediately send back an indication that the data is not currently available, and the web server may forward the indication to the browser and tear down the connection. The time it takes for the web server to receive an indication that the requested content is not yet available may be very small, and thus, the amount of time that a web server connection and corresponding process is tied to the content request process may be very small. Once freed from having to wait for the content service request to be satisfied, the freed connection/process may be used for a new incoming request.

The proxy cache server asynchronously forwards requests for content that were not serviced from the cache, and when the proxy cache server receives the content from the remote content server, the proxy server stores the content in the cache for later retrieval.

In response to instructions encoded within the web page, the browser may automatically and periodically issue multiple retry requests for the content that was originally missing from the cache. Once the content is in the cache, the browser's request for the content may be satisfied, and no further retries are necessary. When the browser receives the content, the browser updates the display with the embedded content.

Serving Web Page Requests

Figure 2:
FIG. 2 illustrates a screen shot of an example web page.

FIG. 2 is an example web page. The web page has multiple display areas, and an independent content service may produce the content to be displayed within a display area of the web page. Facebook 210, Weather 220, and Sports 230 are example services whose content may be viewed within a display area of the web page. The web server may retrieve content corresponding to for each of the service icons, and the content may be included in the web page itself. The content may be selectively displayed by the browser based upon user interaction with service icons. However, the large number of services seen on the left margin of the page may be very time consuming to proactively retrieve, causing a potentially long delay for providing the web page and causing other web page requests to be blocked from processing.

Alternatively, when the web server receives the initial web page request, the web server may return the text, graphics for displaying the static portions of the web page. Instead of retrieving the content associated with each service icon, the web server may embed executable statements such as JavaScript associated with each service icon. Thus, the actual content request may not be requested in response to or synchronous with the initial web page request.

A web server's performance may be enhanced by being able to recognize that an incoming content service request is a retry request rather than an initial content service request. Each time a request is received, session-based data structures are initialized. When the incoming request is recognized to be a retry, the web server may be able to determine that it is not necessary to re-initialize preferences and other settings.

Executable Browser Statements

The executable statements contained in the initially requested web page may be statically defined or dynamically generated and placed into the web page by the web server. A separate set of executable statements may be associated with each service icon in the web page. These statements include at least the identity of the user and a URL of the server that identifies the location of the requested service. In addition, the executable statements may specify control information that indicates (a) how many times the web browser should retry requests for the content if the content is not returned, and (b) how long to wait between retries (also called the retry time interval).

In an embodiment, the executable statements may be statically configured within the web server, and embedded into a web page when the browser requests the web page. That is, the executable statements for retrying retrieval of service content may be common across all browsers that access the web page over time.

In another embodiment, the executable statements may be dynamically generated by the web server based on historical data of how long similar accesses have taken, but the executable statements may encode the retry interval and not depend on additional external state. Thus, once a client accesses the web page, the executable statements for retrying retrieval of application service content is self-contained, i.e. has all of the retry intervals predefined. However, the experience of one client may be used to generate better retry intervals for subsequent clients that access the content service.

In an alternate embodiment, rather than the retry interval information being placed into the executable code itself, the executable code may be written to set the next retry interval based on data passed back in a failed retry response. Thus, the retry intervals need not be defined at the time of web page generation. Each retry interval used by a particular client can benefit from experience with retrieving data for a particular content service.

The executable statements may include statements that execute asynchronously (in a separate browser thread) such that the user can continue interacting with the browser while the browser generates an HTTP request for content associated with a service. For example, executable statements may be written in AJAX which is triggered by an event. One kind of event may be a user clicking on the icon associated with the service. Another kind of event may be a timer expiration, such as would occur after a retry time interval.

In one embodiment, the executable statements may be executed in response to a user clicking on the associated icon. For example, after displaying the web page in FIG. 2, the web browser may not request the Facebook service content until the user clicks on the Facebook service icon. Only then would the browser send the first request for Facebook content. In response, the browser might immediately receive an indication that the Facebook content for the requesting user is not available. The executable statements would then automatically retry the service content request after the retry time interval. In another embodiment, the executable statements may be automatically triggered by the browser without user intervention. For example, perhaps a user is interested in the weather in a remote location and always wants the current weather displayed in the web page. The weather service may be provided by a content server in a remote location, and thus the use of the multiple retry technique is preferable to making the web server wait for the weather content before returning the remainder of the web page to the browser. However, it may be convenient for the user for the weather service request to be initiated automatically by the browser with no required user action.

Web Proxy Caching Server

The browser executable statements may request content from a content service. The browser's request may be sent to a web server that in turn requests data from a web proxy caching server. If the requested content is not already stored in the cache, the request may return immediately with an indication that the data is not currently available. The web proxy caching server may asynchronously forward the request to the content service and place the returned content in the cache so that it will be available when the browser requests the content on a subsequent retry.

Figure 3:
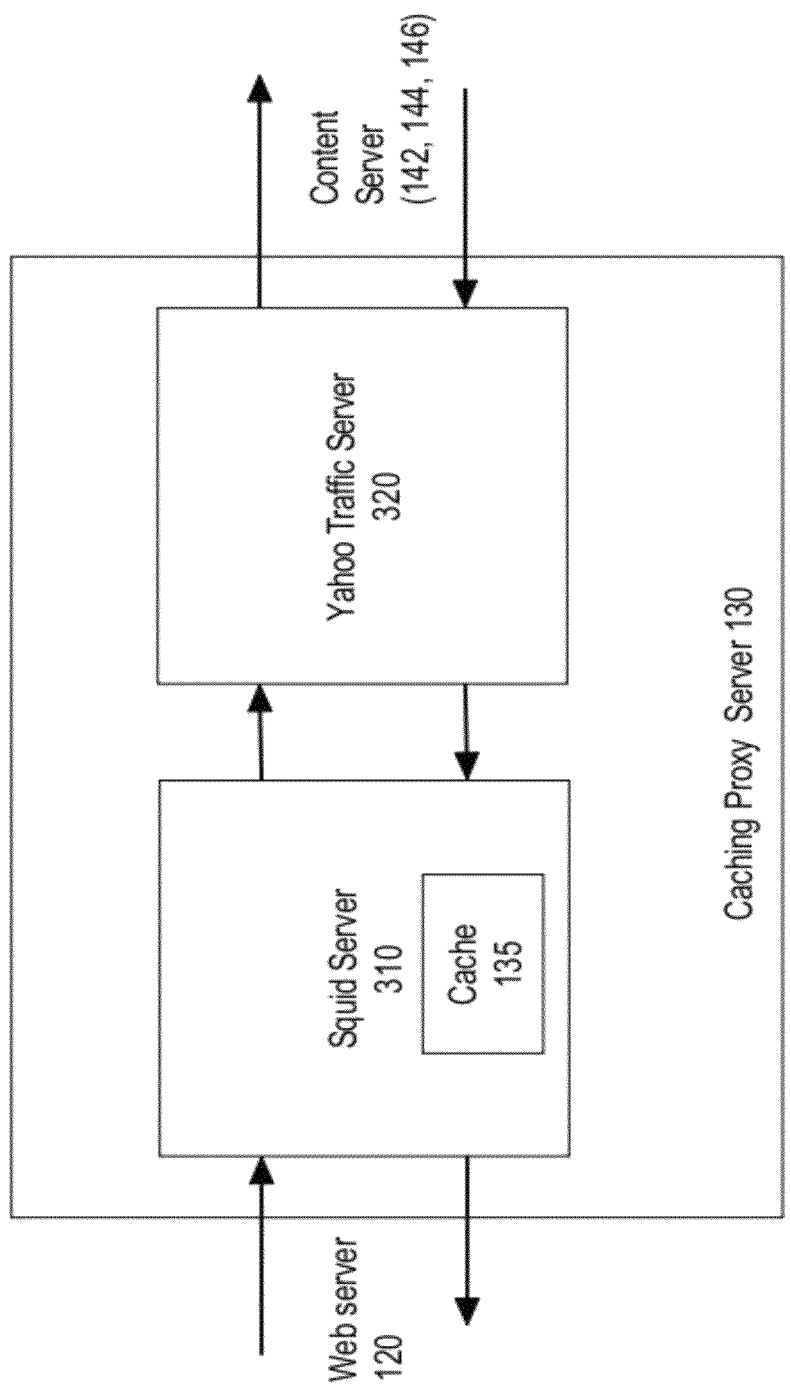
FIG. 3 illustrates components within a caching proxy server, according to an embodiment.

FIG. 3 shows more detail of the Web Proxy caching server according to an embodiment. The web proxy is comprised of two multi-threaded applications, Squid Server and Apache Traffic Server, although the functionality of the Squid Server and the Apache Traffic Server may be merged into a single multi-threaded process. Both applications are available as open source from Squid-Cache.org and the Apache Software Foundation respectively. The proxy cache may run on a separate computer, or the proxy cache may be hosted on the same computer as the web server. A proxy cache running on a separate computer may be located in the same building as the web server or in a building to which there is a high-speed network connection with the web server.

In contrast to the Apache Web Server, the Caching Proxy Server 130 may be multithreaded; the caching proxy server may service many more concurrent requests. For example, the caching proxy server may be able to maintain on the order of 20,000 connections per server.

Squid Server 310 maintains Proxy Cache 135, receives content requests from a web server, and responds immediately with an indication that requested content is not in the cache or alternatively, returns requested content that is found in the cache. Squid Server 310 asynchronously forwards requests for content that is not in the cache to the Apache Traffic Server 320. Outbound, the Apache Traffic Server 320 simply forwards the request out. However, upon receiving the content from one of Content Servers 142, 144, or 146, the Apache Traffic Server 320 modifies the response before forwarding the response back to the Squid Server 310.

Web proxy caching servers are built to cache HTTP GET method requests, not POST method requests. GET is used for retrieving data and POST is used when sending data. Thus, under normal circumstances, it would not make sense to cache the reply to a POST method. However, content services may require input information, and that information is communicated via POST method variables. Thus, the request for content may be generated as a POST method HTTP request. In order for the proxy server to cache the response, the Apache Traffic Server 320 modifies the method name in the HTTP response from POST to GET so that the Squid Server 310 will store the response in the Proxy Cache 135.

Similarly, by convention, the presence of a header, such as Cache-Control:private, is a signal to a caching proxy server to not cache the data in the response. The original intent for the use of such a header was to avoid providing stale data from the cache. For example, it would not make sense to cache data that changes very quickly because cached data would usually be stale. However, this header is being exploited by content providers who simply do not want their information replicated at remote sites. Using the Cache-Control: private header is a way to control caching their content even though this use of the header is not in the spirit of the intended purpose. If a Cache-Control: private header is found in an HTTP response, the Apache Traffic Server 320 may remove the header so that the Squid Server 310 will cache the content in Proxy Cache 135. This allows the Squid Server 310 to cache the desired content without having to modify the Squid code base.

Figure 4:
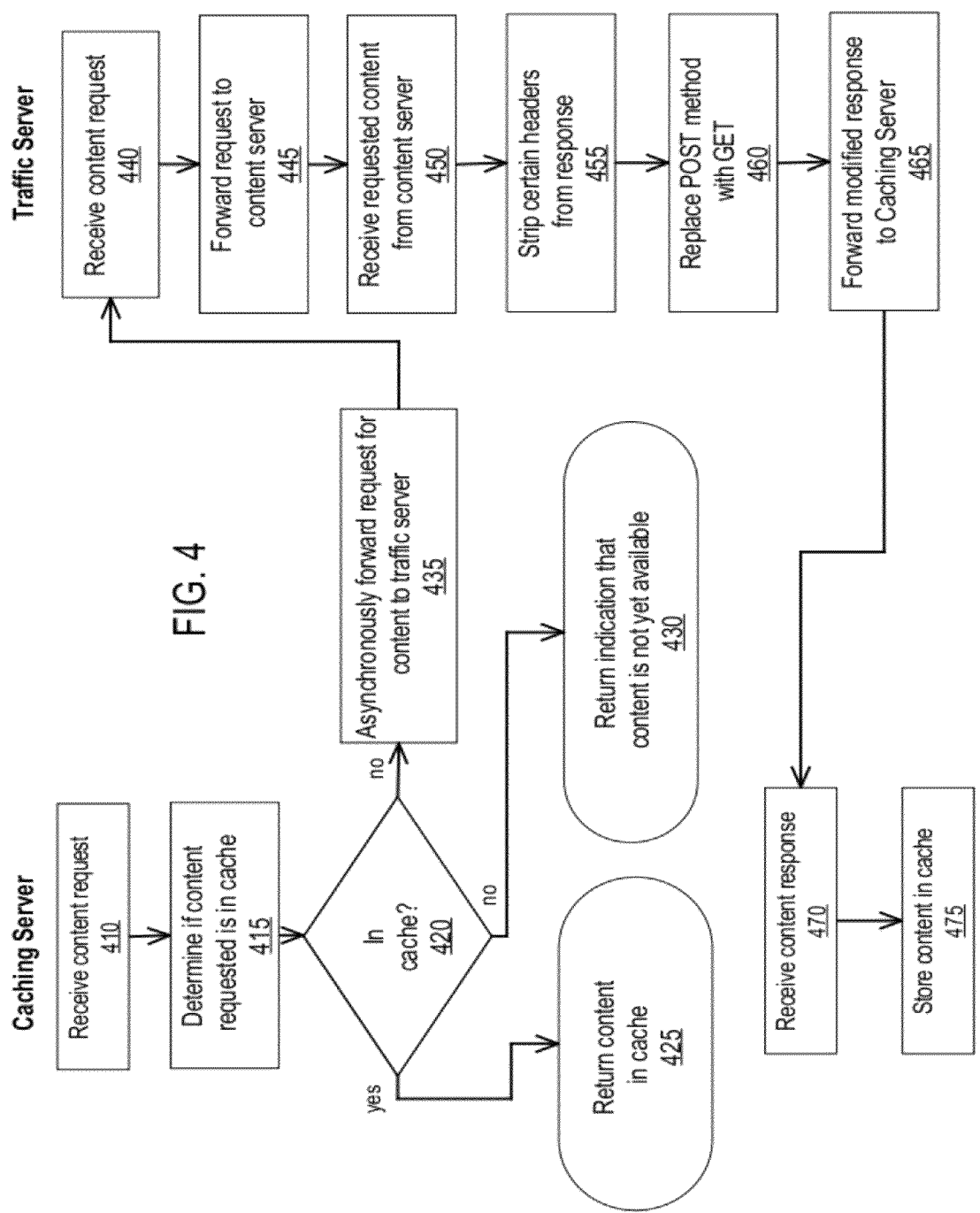
FIG. 4 is a flow diagram that illustrates the operation of a caching server and a traffic server and their interaction, according to an embodiment.

FIG. 4 is a flow diagram showing the steps performed by the caching proxy server. The left side of the diagram shows the steps performed by the caching server (e.g. Squid Server) and the right side of the diagram shows the steps performed by the traffic server (e.g. Apache Traffic Server). In Step 410, the caching server receives a request for content from the web server. In Step 415, the caching server looks in the cache for the requested content. The requested content is identified by (1) a unique URL that includes both the identification of the service that produces the desired content and (2) the identity of the user requesting the data. Thus, in Step 420 the URL in the request may be directly matched against a URL in the cache index to determine if the content is available. If the content is in the cache, then in Step 425, the caching server responds to the web server request providing the cached content, and terminates the connection with the web server.

In order to protect the privacy of the user, cached content is only stored in memory, never on disk, and only stored for a short period of time, for example, one minute. Thus, the common case is that the first request for content will not find the data in the cache. However, if the user clicked a service icon twice within the cache timeout period, it is possible that the initial content request corresponding to the second click could result in data being retrieved from the cache.

If the requested content is not in the cache, then two actions are taken. In Step 430, the caching server responds to the web server with an indication that the content is not available, and it terminates the connection. In addition, the caching server in Step 435 forwards the request for content to the traffic server. If the caching server receives a request for a URL that has already been requested (that is, forwarded to the traffic server) but for which no response has been received, no additional request is generated. The caching server does not need to know whether the redundant request is a retry request or an initial request.

The traffic server receives the request for content from the caching server in Step 440. The traffic server forwards the request to the content server in Step 445. After receiving the response from the content server, in Step 450, certain headers, such as the Cache-Control:private header, are stripped from the response in Step 455. In Step 460, if the HTTP method is POST, the method name is replaced by GET. The modified response is sent to the caching server in Step 465. The caching server receives the content response in Step 470 and stores the content in the cache.

There are at least two ways that the Squid Server can provide the desired behavior of returning immediately without waiting for the request to be satisfied by a remote content service. In one embodiment the Squid Proxy caching server can be configured with a very short time-out, for example 10 ms. This approach requires no code changes to the Squid code base. If the requested object is not in the cache, Squid's attempt to retrieve the object from elsewhere synchronous with the request, times out, and Squid responds to the client with an indication that the desired content was not found. In another embodiment, Squid can be modified to only return data when the data is in cache and all other times simply return an indication that no data was available.

Selecting Static Retry Intervals

There are many different ways that the number of retries and the retry interval may be determined, but in general, the selection of retry interval and number of retries may be based on attributes of the service that returns the requested data. These attributes may include the location of the content server, the complexity of producing the requested data, or empirical observation of the performance of the service over recent history. The number of retries and the retry interval may be manually determined and statically configured for each content service. For example, the static configuration may be based on the region in which the content server providing the service is located, which is an attribute of the service that does not change. For example, referring to FIG. 1, services in Region 160 may be configured to use a retry interval of 400 ms between each of 5 retries, whereas services in Region 170 may be configured to use a retry interval of 800 ms between each of 4 retries. The number of retries and retry interval may also be configured based on the latency of the service itself, the time required to produce the content, and/or the expected load on the content server. In an embodiment, the retry interval between any retry and the previous request is the same amount of time.

Selecting Variable Retry Intervals Based on Binary Search Learning Algorithm

A learning algorithm may be used to establish optimal retry intervals without first mining historical retry data from logs. In one embodiment, a first retry interval is selected. The first retry interval may be manually configured and automatically updated over time. In another embodiment, the first retry interval may be selected at random within an initially configured interval that may be automatically updated over time. In an embodiment in which the next retry interval is passed back to the client in a response, the server may determine the next retry interval based on recent experience across clients. For example, a server may track the longest unsuccessful retry interval and the shortest successful retry interval across any client retry attempt for a particular content service. When requesting service content, the client may include in the request, an indication of how long the client has waited since the last request (i.e. the current retry interval). Each time the data is not found in the cache, the longest unsuccessful retry interval may be assigned to the maximum of the current longest unsuccessful retry interval and the current retry interval.

new longest unsuccessful retry interval=max(longest unsuccessful retry interval,current retry interval)

The next retry interval may be set to a multiple of the current retry interval. For example, a factor of two may be used (e.g. the next retry interval may be selected to be twice the amount of time as the current retry interval). When the data is found in the cache, the shortest successful retry interval may be set to the minimum of the shortest successful retry interval and the current retry interval:

new shortest successful retry interval=min(shortest successful retry interval,current retry interval)

The initial retry interval that is provided to clients for their first retry interval may be set to the midpoint between the shortest successful retry interval and the longest unsuccessful retry interval. For example:

next retry interval=(longest unsuccessful retry interval+shortest successful retry interval)/2

For embodiments in which the server learns better estimates for the retry interval based on experience—that is, for embodiments in which the server saves state across application requests and uses the state for either generating subsequent executable code or for passing back the next retry interval—each of the web server instances may share this experience (state) with other web server instances. There is no guarantee that subsequent retries of a particular browser will be handled by the same web server each time, and there is no guarantee that all requests for a particular content service will be handled by the same web server. Thus, to converge on a retry interval that is the shortest amount of time necessary to wait for retrieving requested data (an optimal retry interval), the web servers may share state. Sharing state among the web servers may be accomplished by any means such as through shared memory, shared disk, or group communication protocol.

Selecting Variable Retry Intervals Based on Historical Knowledge

In another embodiment, the retry interval may vary across subsequent retries based on expected behavior observed over time. Performance improvement may be realized by observing that content service response times will be different depending on the state of the system as a whole. For example, if the content is already in the cache, the data may be returned within a few hundred milliseconds. Thus it would not make sense for the first retry interval to be less than the time it would take to retrieve the content from the cache if it is there. However, if the content is not in the cache (the common case), the fastest the content is likely to be loaded into the cache would be the fulfillment of a local content service request. If the local content service request usually takes about 1 second, then retrying every 400 ms. would result in two retry requests that would not return the requested data. The expected timing for each state scenario may be used to establish progressively longer timeout intervals so as to address when the data is likely to be available without incurring the cost of unnecessarily retrying.

Historical response time data recorded over a long time period, such as days, weeks, months, or years depending on how much variation there is in the data over time, may be analyzed to determine multi-model clusters of response times. If the response time has been unchanging over time, analysis over a longer period of time will be more accurate. An example of using historical response times for establishing variable retry intervals is as follows. The response times to a content request may be, and would expected to be, different depending on whether the data is in the cache at the time of the request, whether the content is successfully retrieved from a local content server, retrieved from a remote content server, or whether a connection to the content server is not available such when the network or server fails. For example, if data can be successfully returned within 200 ms when it is in the cache, 1 second when the content service resides locally, 5 seconds when remote data is successfully retrieved, and more than a minute when a failure prevents successful retrieval, then a maximum of four retry requests may be configured with a varying retry interval configured as shown in Table 1. Once it is determined that the service is not available, an error message may be returned rather than continuing to retry indefinitely.

If the response times for each of the scenarios are mostly constant over time, it may be sufficient to manually configure the length of each variable retry interval. Alternatively, the analysis and updating of these variable retry intervals may be performed automatically and dynamically by the system.

TABLE 1

Example Variable Retry Intervals

| after | before | state | wait how long |
|---|---|---|---|
| initial request | first retry request | first request did not retrieve data from cache | wait at least 200 ms but less than 2 seconds before first retry |
| first retry request | second retry request | data was not available locally | 7 seconds |
| second retry request | third retry request | data was not available remotely | 2 minutes |
| third retry request | fourth retry request | service still unavailable | 5 minutes |

Dynamic Adjustment of Retry Intervals

In contrast to the technique described above that relies on historical data over a long time period when the performance of the server is stable over time, an alternative approach that may be beneficial in a more dynamic environment is to use historical data over a shorter time period such as on the order of seconds, minutes, hours, or days. For example, if the load on the content service server is increasing rapidly and the response time has become progressively slower as a result, then analysis over a shorter period of time will be more meaningful. The web server can dynamically determine an appropriate set of retry intervals based on recent (short time period) historical behavior with the server. The web server logs each request and response, and thus, its activity logs may be analyzed to determine how long a service has been taking recently to satisfy requests. Retry intervals may be established based on that recent historical information. For example, if a service goes down, the first browser to request the service will be unsuccessful with every retry. A longer retry interval may be used based on the recent historical knowledge that requests issued after shorter intervals have not succeeded. For as long as the service is down, the web server may make the retry intervals longer with each retry request as the web server learns that the service is not responding. Not only does this raise the probability that the service will be able to respond over the longer period of time it takes to exhaust all retries, but it also reduces the number of wasted requests on the web server. Eventually, once the server comes back up, the web server will learn that requests have been satisfied more quickly, and thus, the retry interval can be reduced again.

Figure 5:
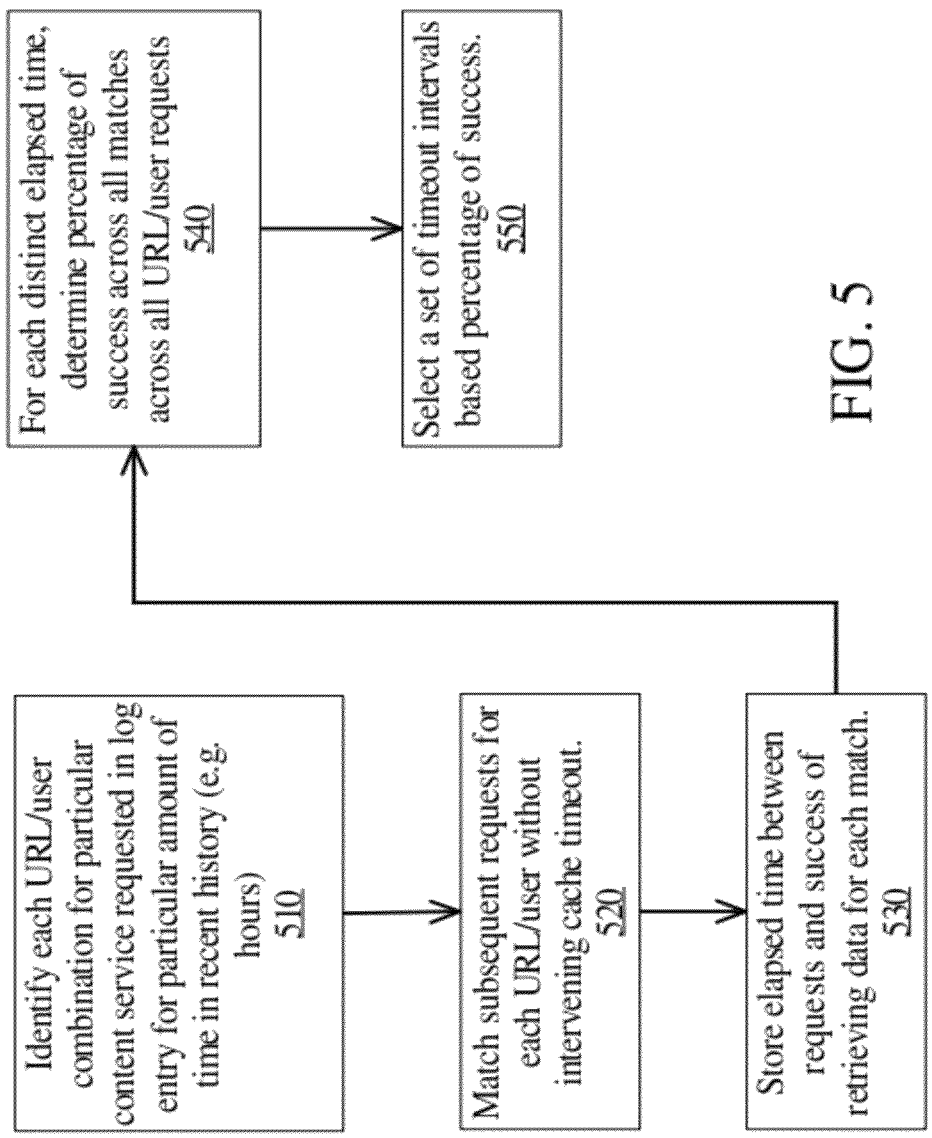
FIG. 5 is a flow diagram that illustrates selecting dynamic retry time intervals based on recently recorded activity log entries, according to an embodiment.

FIG. 5 is a flow diagram that shows an example technique for automatically and dynamically adjusting time intervals over a short historical time frame. This technique is especially useful for adjusting for transient outages and delays such as an overloaded network or a content service being taken offline. In Step 510, the activity log is scanned for requests to a particular content service within the recent historical period. URL/user pairs where the URL identifies content from the particular content server are identified within that portion of the log. In Step 520, pairs of URL/user request that were issued subsequent in time (that is, no intervening URL/user requests) and for which there is no intervening cache timeout for the content identified by the URL/user. The difference in time between each request in the pairs of requests represents a retry time interval. In Step 530, the retry time interval is determined for each pair, and stored in association with an indication of whether the data was successfully retrieved by the latter request of the pair. In Step 540, for each distinct retry time interval determined in Step 530, a percentage of success may be determined. For example, if there were two instances of a 400 ms. retry interval, one of which successfully returned the requested content and the other did not, there would be a 50% success rate for a 400 ms. time interval. In Step 550, a set of time intervals may be selected based on their percentage of success. In an embodiment, if no success rate exceeds a threshold, a longer time interval may be selected than is represented in the log. For example, if a content server is taken offline and the longest time interval in the log is 10 minutes with a 0% success rate, a longer time interval than 10 minutes may be selected, for example 20 minutes. Alternatively, the number of retries may be reduced in order to reduce the number of unsuccessful retries when there is an indication that the service is unavailable.

Bypassing the Apache Server on Retries

As explained above, a connection to a web server is a more expensive resource than a connection to the caching server. The approach can be further enhanced by bypassing the web server altogether when there is no data in the cache to satisfy a retry request. In an embodiment, the browser may send the browser's request directly to the caching server instead of sending a content service request through a web server. When there is no data in the cache, the response may be sent directly back to the browser, again bypassing the web server. According to an embodiment, when there is data in the cache, the data may be formatted properly before it is sent back to the browser. For example, the form of a response from a content service may be raw XML/Java Script Object Notation (JSON), and the response may be reformatted into a Personal Home Page Hypertext Pre-processor (PHP) data structure. During this reformatting phase, only the required items from the raw XML/JSON may be extracted. Alternatively, the cache may be storing a comma separated list of information requested of the content service. The comma-separated list of information may be converted into a visual format for display in the client's browser. The visual format could just be HTML format for a web page, a specific format for a mobile device, or the reformatted response may be a JSON output that the client knows how to format. Also the data may be stored in the cache in an encrypted/serialized format then additional decryption/deserialization may be needed before applying formatting rules.

In an embodiment, the caching server may send a request to the web server to format the data. The web server may then send the formatted data back to the caching server. Upon receiving the formatted data back from the web server, the caching server may return the requested data to the browser. In another embodiment, a traffic server plug-in can be invoked to format the service content data supplied from the cache, and the formatted data can be returned to the browser without involving the web server. The plug-in essentially performs the data formatting functions that the web server would have performed. Having a traffic server plug-in that can format service content data may avoid tying up a web server session to format data.

As mentioned above, the web server can be bypassed when the requested data is not in the cache. However, for some embodiments, whenever the data is not in the cache, a next retry interval may be returned. In an embodiment in which the next retry interval is provided to the client in a response that indicates data was not available, if the web server were required to determine the next retry interval, then the web server could not be bypassed. Instead, a traffic server plug-in may perform the role of tracking the state of timeouts for a content service, determining the next best retry interval for a client to use, and sending the retry interval back to the client. Thus, the most current information may be used to determine the next retry interval even when the web server is not involved in processing a retry request. A plug-in such as described herein may be a general-purpose retry mechanism for a number of applications. Alternatively, a plug-in may be provided that is specific to a particular content service and the method used to determine the next retry interval may be based on knowledge about the configuration of the particular content service.

Just as the cache itself is shared among instances of the caching servers, the traffic server plug-ins may share timing data among the traffic server plug-ins.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
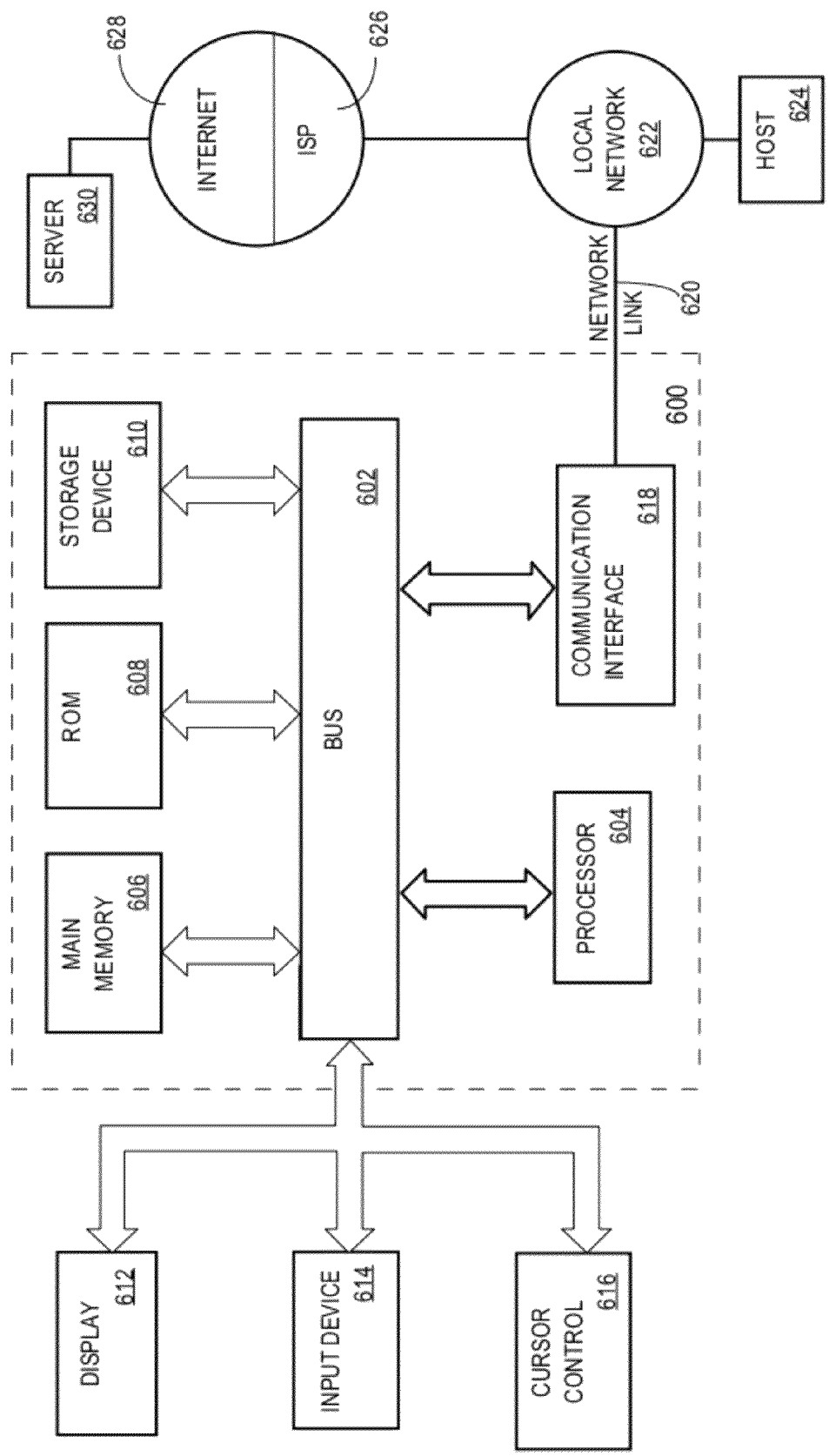
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
   in response to a request for a web page, a web server generating and providing the web page to a web browser executing on a client device, wherein the web server generating the web page includes the web server including in the web page a plurality of executable statements that includes:
   a first set of one or more executable statements which, when executed by the web browser, causes the web browser to perform generating a first data request to return data to be displayed within the web page;
   a second set of one or more executable statements which, when executed by the web browser, causes the web browser to perform sending the first data request to the web server;
   a third set of one or more executable statements which, when executed by the web browser, causes the web browser to perform determining whether the requested data to be displayed within the web page was returned to the web browser; and
   a fourth set of one or more executable statements which, when executed by the web browser, causes the web browser to perform in response to determining that the requested data to be displayed within the web page was not returned to the web browser,
   generating a second data request to return the data to be displayed within the web page; and
   sending the second data request to return the data to be displayed within the web page to the web server.

2. The method of claim 1, wherein the plurality of executable statements is executed in response to a user requesting data to be returned and displayed by selecting an area on the web page.

3. The method of claim 1, wherein the plurality of executable statements is executed automatically by the web browser without waiting for a user select a region displayed on the web page.

4. The method of claim 1, wherein the plurality of executable statements, which when executed by the web browser, cause the web browser to wait a specified time between determining that the requested data to be displayed within the web page was not returned to the web browser and when the second data request to return the data to be displayed within the web page is sent to the web server; and
   wherein the plurality of executable statements, which, when executed by the web browser, cause data requests to continue to be sent to the web server for a specified number of retries.

5. The method of claim 4, wherein the specified time is based on a location of the computer running the service that returns the requested data to be displayed within the web page.

6. The method of claim 4, wherein the specified time is based on an amount of time to retrieve data from the service over recent history.

7. The method of claim 1, wherein the plurality of executable statements further includes executable statements, which when executed by the web browser cause the web browser to perform:
   in response to determining that the requested data to be displayed within the web page was not returned to the web browser in response to the second data request to return the data to be displayed within the web page, generating a third data request to return the data to be displayed within the web page;
   sending the third data request to return the data to be displayed within the web page to the web server;
   wherein a time interval between the first data request to return data to be displayed within the web page and the second data request to return the data to be displayed within the web page is different than the time interval between the second data request to return the data to be displayed within the web page and the third data request to return the data to be displayed within the web page.

8. The method of claim 1, further comprising:
   the web server receiving the first data request to return data to be displayed within the web page from the web browser, wherein the first data request to return data to be displayed within the web browser identifies a user and a service from which to request the data;
   forwarding the first data request to return data to be displayed within the web page to the service through a web caching proxy;
   returning an indication that the requested data is not stored in a cache;
   forwarding the first data request to return data to be displayed within the web page to the service;
   receiving the requested data from the service;
   storing the requested data in the cache;
   receiving the second data request to return the data to be displayed within the web page from the web browser;
   retrieving the requested data from the cache; and
   forwarding the requested data to the web browser.

9. One or more non-transitory computer-readable storage media storing instructions which, when processed by one or more processors, causes:
- in response to a request for a web page, a web server generating and providing the web page to a web browser executing on a client device, wherein the web server generating the web page includes the web server including in the web page:
  - a first set of one or more executable statements which, when executed by the web browser, causes the web browser to perform generating a first data request to return data to be displayed within the web page;
  - a second set of one or more executable statements which, when executed by the web browser, causes the web browser to perform sending the first data request to the web server;
  - a third set of one or more executable statements which, when executed by the web browser, causes the web browser to perform determining whether the requested data to be displayed within the web page was returned to the web browser; and
  - a fourth set of one or more executable statements which, when executed by the web browser, causes the web browser to perform in response to determining that the requested data to be displayed within the web page was not returned to the web browser,
    - generating a second data request to return the data to be displayed within the web page; and
    - sending the second data request to return the data to be displayed within the web page to the web server.

10. The one or more non-transitory computer-readable storage media of claim 9, wherein the plurality of executable statements is executed in response to a user requesting data to be returned and displayed by selecting an area on the web page.

11. The one or more non-transitory computer-readable storage media of claim 9, wherein the plurality of executable statements is executed automatically by the web browser without waiting for a user select a region displayed on the web page.

12. The one or more non-transitory computer-readable storage media of claim 9, wherein the plurality of executable statements, which when executed by the web browser, cause the web browser to wait a specified time between determining that the requested data to be displayed within the web page was not returned to the web browser and when the second data request to return the data to be displayed within the web page is sent to the web server; and
- wherein the plurality of executable statements, which, when executed by the web browser, cause data requests to continue to be sent to the web server for a specified number of retries.

13. The one or more non-transitory computer-readable storage media of claim 12, wherein the specified time is based on a location of the computer running the service that returns the requested data to be displayed within the web page.

14. The one or more non-transitory computer-readable storage media of claim 12, wherein the specified time is based on an amount of time to retrieve data from the service over recent history.

15. The one or more non-transitory computer-readable storage media of claim 9, wherein the plurality of executable statements further includes executable statements, which when executed by the web browser cause the web browser to perform:
- in response to determining that the requested data to be displayed within the web page was not returned to the web browser in response to the second data request to return the data to be displayed within the web page, generating a third data request to return the data to be displayed within the web page;
- sending the third data request to return the data to be displayed within the web page to the web server;
- wherein a time interval between the first data request to return data to be displayed within the web page and the second data request to return the data to be displayed within the web page is different than the time interval between the second data request to return the data to be displayed within the web page and the third data request to return the data to be displayed within the web page.

16. The one or more non-transitory computer-readable storage media of claim 9, further comprising additional instructions which, when processed by the one or more processors cause:
- the web server receiving the first data request to return data to be displayed within the web page from the web browser, wherein the first data request to return data to be displayed within the web browser identifies a user and a service from which to request the data;
- forwarding the first data request to return data to be displayed within the web page to the service through a web caching proxy;
- returning an indication that the requested data is not stored in a cache;
- forwarding the first data request to return data to be displayed within the web page to the service;
- receiving the requested data from the service;
- storing the requested data in the cache;
- receiving the second data request to return the data to be displayed within the web page from the web browser;
- retrieving the requested data from the cache; and
- forwarding the requested data to the web browser.

* * * * *